(12) United States Patent
Andrivon et al.

(10) Patent No.: US 10,389,991 B2
(45) Date of Patent: Aug. 20, 2019

(54) METHOD FOR ENCODING AND METHOD FOR DECODING A COLOUR TRANSFORM AND CORRESPONDING DEVICES

(71) Applicant: THOMSON Licensing, Issy les Moulineaux (FR)

(72) Inventors: Pierre Andrivon, Liffre (FR); Philippe Bordes, Laille (FR); Emmanuel Jolly, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/991,808

(22) Filed: May 29, 2018

(65) Prior Publication Data

US 2018/0278909 A1 Sep. 27, 2018

Related U.S. Application Data

(63) Continuation of application No. 14/905,610, filed as application No. PCT/EP2014/064783 on Jul. 10, 2014, now Pat. No. 10,051,254.

(30) Foreign Application Priority Data

Jul. 15, 2013 (EP) .................................. 13306010
Jul. 24, 2013 (EP) .................................. 13306068
(Continued)

(51) Int. Cl.
*H04N 11/20* (2006.01)
*H04N 11/24* (2006.01)
(Continued)

(52) U.S. Cl.
CPC ............. *H04N 11/20* (2013.01); *H04N 11/24* (2019.01); *H04N 19/186* (2014.11); *H04N 19/46* (2014.11); *H04N 19/70* (2014.11)

(58) Field of Classification Search
CPC ........ H04N 11/20; H04N 11/24; H04N 19/70; H04N 19/46; H04N 19/186
(Continued)

(56) References Cited

U.S. PATENT DOCUMENTS 8,248,486 B1 8/2012 Ward et al.
2003/0112454 A1 6/2003 Woolfe et al.
(Continued)

FOREIGN PATENT DOCUMENTS

RU 2413383 1/2006
WO WO2010128962 11/2010
(Continued)

OTHER PUBLICATIONS

Bross et al: "High Efficiency Video Coding (HEVC) text specification draft 10 (for FDIS & Last Call)", JCT-VC of ITU-T SG 16 WP 3 and ISO/IEC JTC 1/SC 29/WG 11, 12th Meeting: Geneva, CH, Jan. 14-23, 2013.
(Continued)

*Primary Examiner* — Marnie A Matt
(74) *Attorney, Agent, or Firm* — Brian J. Dorini; Xiaoan Lu

(57) ABSTRACT

A method for encoding a colour transform is disclosed that comprises encoding first parameters representative of video signal characteristics of colour output decoded pictures remapped by said at least one color transform and encoding second parameters representative of said at least one colour transform.

26 Claims, 4 Drawing Sheets

(30) Foreign Application Priority Data

Sep. 23, 2013 (EP) .................................. 13306291
Dec. 12, 2013 (EP) .................................. 13306707

(51) Int. Cl.
*H04N 19/70* (2014.01)
*H04N 19/46* (2014.01)
*H04N 19/186* (2014.01)

(58) Field of Classification Search
USPC .................................................. 375/240.01
See application file for complete search history.

(56) References Cited

U.S. PATENT DOCUMENTS

| | | | |
|---|---|---|---|
| 2005/0141617 | A1 | 6/2005 | Kim et al. |
| 2008/0253445 | A1 | 10/2008 | Hekstra et al. |
| 2009/0052539 | A1 | 2/2009 | Yu et al. |
| 2009/0141810 | A1 | 6/2009 | Tabatabai et al. |
| 2014/0003487 | A1 | 1/2014 | Haque et al. |
| 2014/0086331 | A1* | 3/2014 | Wang .............. H04N 19/70 375/240.25 |
| 2014/0241418 | A1 | 8/2014 | Garbas et al. |
| 2014/0307785 | A1 | 10/2014 | Topiwala et al. |
| 2014/0355897 | A1* | 12/2014 | Tourapis .......... H04N 19/70 382/233 |
| 2014/0376611 | A1 | 12/2014 | Kim et al. |

FOREIGN PATENT DOCUMENTS

| | | |
|---|---|---|
| WO | WO2013068132 | 5/2013 |
| WO | WO2014008170 | 1/2014 |
| WO | WO2014166705 | 10/2014 |
| WO | WO2014193538 | 12/2014 |

OTHER PUBLICATIONS

Recommendation ITU-R BT.709-5, Parameter values for the HDTV standards for production and international programme exchange, Apr. 2002.
Recommendation ITU-R BT.2020, Parameter values for ultra-high definition television systems for production and international programme exchange, Aug. 2012.
Chen et al: "SHVC draft text 1", JCTVC of ITU-T SG16 WP3 and ISO/IEC JTC1/SC29/WG11, JCTVC-L1008, 12th Meeting: Geneva, CH, Jan. 14-23, 2013.
Series H: Audiovisual and Multimedia Systems Infrastructure of audiovisual services—Coding of moving video, ITU-T H.265, Oct. 2014.
Studio encoding parameters of digital television for standard 4:3 and wide-screen 16:9 aspect rations. Recommendation ITU-R BT.601-7, Mar. 2011.
Suzuki: "HEVC conformance test development (AHG5)",JCT-VC of ITU-T SG 16 WP 3 and ISO/IEC JTC 1/SC 29/WG 11, JCTVC-L0005, 12th Meeting: Geneva, CH, Jan. 14-23, 2013.
Andrivon et al: "SEI message for Colour Mapping Information", JCT-VC P0126, Joint Collaborative Team on Video Coding (JCT-VC) of ITU-T SG 16 WP 3 and ISO/IEC JTC 1/SC 29/WG 11, 16th Meeting: San José, US, Jan. 9-17, 2014.
Bordes: "Color Mapping SEI message", 15th JCT-VC Meeting: Geneva, Oct. 23-Nov. 1, 2013.
Bordes: "Colour Mapping SEI message", JCTVC O0363 r1, Joint Collaborative Team on Video Coding (JCT-VC), of ITU-T SG 16 WP 3 and ISO/IEC JTC 1/SC 29/WG 11, 15th Meeting: Geneva, CH, Oct. 23-Nov. 1, 2013.
Bordes et al: "SHVC HLS on persistence of Colour remapping SEI message" JCTVC R0344, Joint Collaborative Team on Video Coding (JCT-VC), of ITU-T SG 16 WP 3 and ISO/IEC JTC 1/SC 29/WG 11, 18th Meeting: Sapporo, JP, Jun. 30-Jul. 9, 2014.
Boyce et al: "Draft HEVC version 2 RExt SHVC, and MV-HEVC extensions"_JCTVC R1013_v6, Joint Collaborative Team on Video Coding (JCT-VC), of ITU-T SG 16 WP 3 and ISO/IEC JTC 1/SC 29/WG 11, 18th Meeting: Sapporo, JP, Jun. 30-Jul. 9, 2014.
Chen et al: "Preliminary version of HEVC scalable extension" Draft 6_JCTVC Q1008_v2, Joint Collaborative Team on Video Coding (JCT-VC), of ITU-T SG 16 WP 3 and ISO/IEC JTC 1/SC 29/WG 11, 17th Meeting: Valencia, ES, Mar. 27-Apr. 4, 2014.
Suzuki et al: "Text of ISO IEC 14496-10:2012/DAM 4 additional Colour Space and Tone Mapping Descriptors", N13553, Incheon, KR, Apr. 2013.
Tech et al: "MV HEVC Draft Text 8" JCT3V-H1002-v5, Joint Collaborative Team on 3D Video Coding Extensions, of ITU-T SG 16 WP 3 and ISO/IEC JTC 1/SC 29/WG 11, 8th Meeting: Valencia, ES, Mar. 29-Apr. 4, 2014.
Bordes et al: "Color Mapping SEI message", 14. JCT-VC meeting; Jul. 25, 2013-Aug. 2, 2013; Vienna; (Joint collaborative team on video coding of ISO/IEC JTC1/SC29/WG11 and ITU-T SG.16); URL: HTTP//:WFTP3.ITU.INT/AV-ARCH/JCTVC-SITE/, No. JCTVC-N0180, Jul. 15, 2013, XP030114662, *the whole document*.
Andrivon et al: "SEI message for colour mapping information", 17. JCT-VC meeting; Mar. 27, 2014-Apr. 4, 2014; Valencia; (Joint collaborative team on video coding of ISO/IEC JTC1/SC29/WG11 and ITU-T SG.16); URL: HTTP://WFTP3.ITU.INT/AV-ARCH/JCTVC-SITE/,, No. JCTVC-Q0074-v4, Apr. 2, 2014, XP030115975, the whole document.
Marpe et al: "Macroblock-Adaptive Residual Color Space Transforms for 4:4:4 Video Coding", Oct. 1, 2006, pp. 3157-3160.
Bordes et al: "AHG14: Color Gamut Scalable Video Coding using 3D LUT", JCT-VC of ITU-T SG 16 WP 3 and ISO/IEC JTC 1/SC 29/WG 11, Apr. 16, 2013.
Flynn et al: "HEVC Range Extensions text specification: Draft 3", JCT-VC of ITU-T SG 16 WP 3 and ISO/IEC JTC 1/SC 29/WG 11 13th Meeting: Incheon, KR, Apr. 18-26, 2013.

* cited by examiner

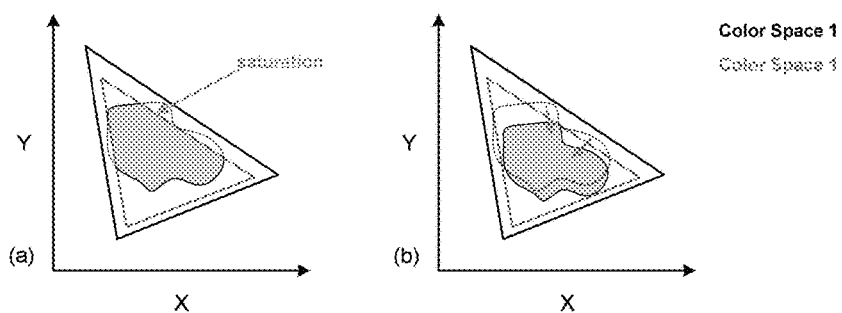
FIGURE 1
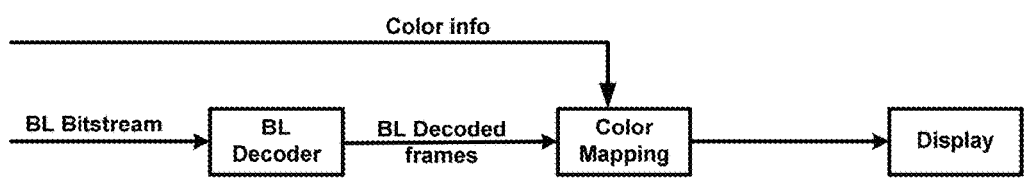
FIGURE 2 – Prior Art
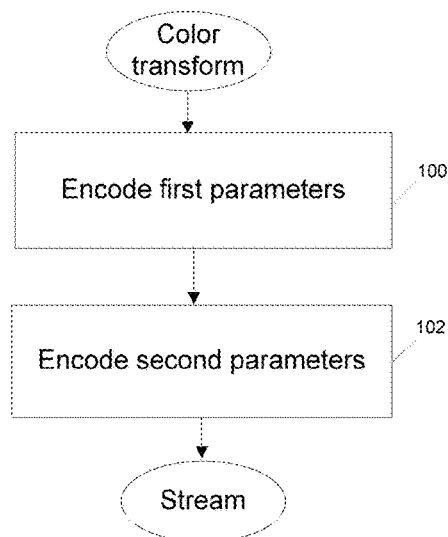
Figure 3

METHOD FOR ENCODING AND METHOD FOR DECODING A COLOUR TRANSFORM AND CORRESPONDING DEVICES

CROSS-REFERENCE TO RELATED APPLICATIONS

The present application is a continuation of U.S. application Ser. No. 14/905,610 filed on Jan. 15, 2016, which claims the benefit, under 35 U.S.C. § 365 of International Application PCT/EP14/064783, filed Jul. 10, 2014, which was published in accordance with PCT Article 21(2) on Jan. 22, 2015 in English and which claims the benefit of European Patent Application 13306010.3, filed Jul. 15, 2013, European Patent Application 13306068.1, filed Jul. 24, 2013, European Patent Application 13306291.9, filed Sep. 23, 2013 and European Patent Application 13306707.4, filed Dec. 12, 2013.

1. FIELD OF THE INVENTION

The invention relates to colour transform encoding. Specifically, a method for encoding a colour transform, a corresponding decoding method, encoding device and decoding device are disclosed.

2. BACKGROUND OF THE INVENTION

The rendering of reconstructed images onto an end-device display is of key importance to insure an end-to-end service quality. However, it is not an easy task because of the wide range of colour formats, of capture capability and of display characteristics. Recently, a new and wider colour space format has been proposed by ITU in the document ITU-R Recommendation BT.2020 (known as Rec. 2020) entitled "Parameter values for UHDTV systems for production and international programme exchange" published in April 2012. Consequently, the compatibility with legacy devices has to be considered. All the rendering devices may not have the capability to adapt to any colour space nor have the required knowledge to perform the optimal colour conversion. Indeed, rather than clipping colours (left part of FIG. 1) one may prefer graceful colour shading for example as illustrated on the right part of FIG. 1. The determination of the colour conversion function is not straightforward because the content creation workflows may include deterministic processing (Colour Space 1 toward Colour Space 2 conversion) but also non-deterministic operations such as colour grading. If two targeted displays with different characteristics are used (e.g. UHDTV display and Rec.709 HDTV display), both the artistic intent and the colour grading may be different. The colour grading depends both on the content characteristics and the reference display.

As depicted on FIG. 2, in video content distribution, a colour transform is usually applied on the decoded pictures so that the mapped decoded pictures are adapted to the end device rendering capability.

This colour transform also known as Colour Mapping Function (CMF) is for example approximated by a 3×3 gain matrix plus an offset (Gain-Offset model) or by a 3D Colour LUT.

There is thus a need to encode a colour transform for example in the form of a 3D Colour LUT in bit-streams, possibly transmitted out-of band. This can provide the necessary flexibility and additional features to applications and services on top of HEVC and SHVC video coding standards.

One solution is to transmit the colour transform or more generally colour metadata at the transport system level in private streams. However, most of the transmission systems discard those metadata because they do not know how to interpret them.

3. BRIEF SUMMARY OF THE INVENTION

The purpose of the invention is to overcome at least one of the disadvantages of the prior art.

A method for encoding at least one colour transform is disclosed. The method comprises:
  encoding first parameters representative of video signal characteristics of colour output decoded pictures remapped by the at least one color transform; and
  encoding second parameters representative of the at least one colour transform.

An encoder for encoding at least one colour transform is disclosed that comprises:
  means for encoding first parameters representative of video signal characteristics of colour output decoded pictures remapped by the at least one color transform; and
  means for encoding second parameters representative of the at least one colour transform.

A decoder for decoding at least one colour transform is disclosed that comprises:
  means for decoding first parameters representative of video signal characteristics of colour output decoded pictures remapped by the at least one color transform; and
  means for decoding second parameters representative of the at least one colour transform.

An encoded video signal representative of at least one colour transform comprising first parameters representative of video signal characteristics of colour output decoded pictures remapped by the at least one color transform and second parameters representative of the at least one colour transform.

Advantageously, the first and second parameters are encoded in or decoded from a supplement enhancement information message.

According to a variant, at least first and second sets of second parameters are encoded, the first set being representative of a first colour transform and the second set being representative of a second colour transform and the first parameters are representative of video signal characteristics of colour output decoded pictures remapped by the first colour transform followed by the second colour transform.

Computer program products are disclosed. They comprise program code instructions to execute of the steps of the method for encoding or of the method for decoding when this program is executed on a computer.

Processor readable medium are disclosed that have stored therein instructions for causing a processor to perform at least the steps of the method for encoding or of the method for decoding.

4. BRIEF DESCRIPTION OF THE DRAWINGS

Other features and advantages of the invention will appear with the following description of some of its embodiments, this description being made in connection with the drawings in which:

FIG. 1 illustrates a colour conversion from a first to a second colour space with clipping (on the left) or gamut compression (on the right);

FIG. 2 illustrates an architecture of a video decoder that comprises colour transform to adapt to rendering display characteristics according to the prior art;

FIG. 3 represents a flowchart of an encoding method according to an exemplary embodiment of the invention;

Figure 7:
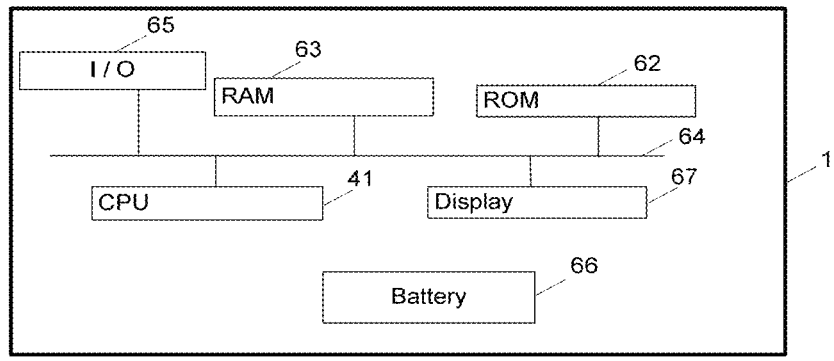
Figure 8:
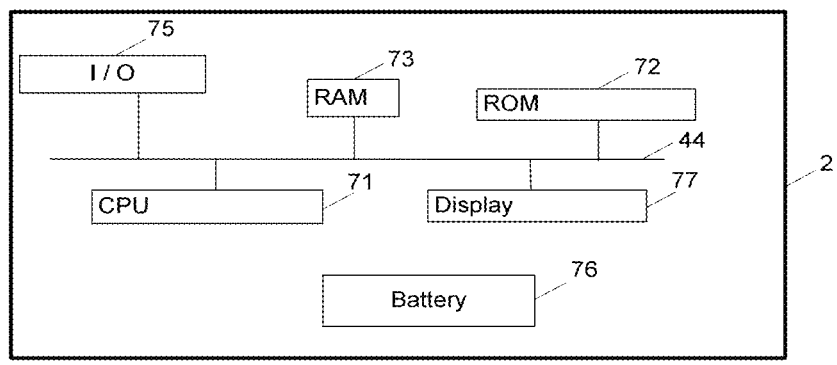
Figure 9:
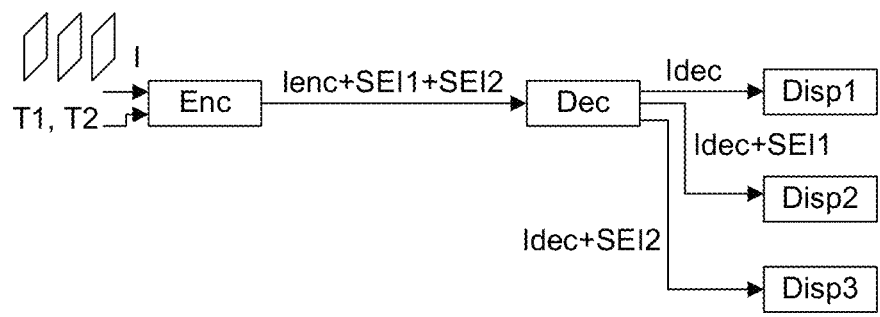

FIG. 7 diagrammatically shows an encoder for encoding a colour transform according to the invention; and FIG. 8 diagrammatically shows a decoder for decoding a colour transform according to the invention; and FIG. 9 diagrammatically shows a video coding/decoding system according to an exemplary embodiment of the invention.

5. DETAILED DESCRIPTION OF THE INVENTION

The invention relates to a method for encoding a colour transform. More precisely, the method according to the invention comprises encoding colour mapping information that enable on the decoder side a remapping of the colour samples of the output decoded pictures for customization to particular display environments. Remap and map are used as synonyms. The remapping process maps/remaps decoded sample values in the RGB colour space to target sample values. Exemplarily, the mappings are expressed either in the luma/chroma or RGB colour space domain, and are applied to the luma/chroma component or to each RGB component produced by colour space conversion of the decoded picture.

FIG. 3 represents a flowchart of an encoding method according to an exemplary and non-limiting embodiment of the invention.

In a step 100, first parameters that describe the colour mapped output decoded pictures video signal characteristics are encoded in a stream, e.g. in a SEI message as disclosed below.

In a step 102, second parameters that describe the colour transform are encoded in the stream, e.g. in a SEI message.

Encoding such colour transform metadata makes it possible to preserve artistic intent (what we could call a Director's mode/vision for the TV set instead of/additionally to using native proprietary TV set post-processing); enhance (e.g. with higher quality graded content like UHDTV Rec.2020) transmitted coded video if display is capable of displaying such enhanced data and vehicle content colour info when addressed/targeted primaries enable a gamut that is much wider (e.g. Rec. 2020) than the actual content gamut. It also makes it possible to gracefully degrade (e.g. Rec. 709 colorist grade) a wide colour gamut graded content (e.g. Rec. 2020 colorist grade) while preserving artistic intent.

An exemplary embodiment is proposed within the framework of the HEVC coding standard defined in document JCTVC-L1003 of Joint Collaborative Team on Video Coding (JCT-VC) of ITU-T SG16 WP3 and ISO/IEC JTC1/SC29/WG11 or within the framework of the SHVC coding standard which is the scalable extension of the HEVC coding standard defined in document JCTVC-L1008 of Joint Collaborative Team on Video Coding (JCT-VC) of ITU-T SG16 WP3 and ISO/IEC JTC1/SC29/WG11 or within the framework of RExt which is the Range extension of the HEVC coding standard defined in document JCTVC-L1005 of Joint Collaborative Team on Video Coding (JCT-VC) of ITU-T SG16 WP3 and ISO/IEC JTC1/SC29/WG11. A standard defines a syntax that any stream of coded data must comply with to be compatible with this standard. The syntax defines in particular how the various items of information are coded (for example the data relating to the pictures included in the sequence, the motion vectors, etc). In the context of SHVC coding standard, the colour transform can be encoded into the PPS, the VPS or in a SEI message (SEI stands for "Supplemental Enhancement Information"). In the context of RExt coding standard, the colour transform can be encoded in a SEI message (SEI stands for "Supplemental Enhancement Information").

According to another advantageous embodiment, the colour transform is encoded in a SEI message (SEI stands for "Supplemental Enhancement Information"). Exemplarily, the HEVC standard defines in its Annex D the way in which additional information termed SEI is coded. This additional information is referenced in the syntax by a field called payloadType. SEI messages assist for example in processes related to display. Note that if the decoding device does not possess the functionalities necessary for its use, this information is ignored. According to a specific embodiment of the invention, a new type of SEI message is defined so as to code additional information relating to the colour transform. For this purpose, a new value for the field payloadType is defined from among the values not yet used (for example payloadType is equal to 24). The syntax of the SEI data (i.e. sei_payload) is extended in the following manner:

TABLE 1

| general colour mapping SEI message | |
|---|---|
| | Descriptor |
| colour_mapping_info( payloadSize ) { | |
|   colour_map_id | ue(v) |
|   colour_map_cancel_flag | u(1) |
|   if( !colour_map_cancel_flag ) { | |
|     colour_map_repetition_period | ue(v) |
|     colour_map_video_signal_type_present_flag | u(1) |
|     if(colour_map_video_signal_type_present_flag ) { | |
|       colour_map_video_format | u(3) |
|       colour_map_video_full_range_flag | u(1) |
|       colour_map_description_present_flag | u(1) |
|       if (colour_map_description_present_flag) { | |
|         colour_map_primaries | u(8) |
|         colour_map_transfer_characteristics | u(8) |
|         colour_map_matrix_coeffs | u(8) |
|       } | |
|     } | |
|     colour_transform ( ) | |
|   } | |
| } | |

In this case, the SEI message thus comprises first parameters that describe the colour mapped output decoded pictures video signal characteristics and second parameters that describe the colour transform. The colour mapped output decoded pictures are the pictures remapped/mapped/transformed by the colour transform. Advantageously, the SEI message comprises an additional syntax element colour_map_model_id that indicates the type of colour transform (3D LUT, three 1D LUTs with a matrix, matrix . . . etc). The Table 1B below is an example of such indication.

TABLE 1B

Interpretation of colour_map_model_id

| colour_map_model_id | Type of transform |
|---|---|
| 0 | 3D LUT |
| 1 | Matrix with Offsets |
| 2 | Three 1D LUTs, i.e. one per component |
| 3 | Three 1D LUTs composed with a matrix and offsets |

This syntax element is colour_map_model_id for example encoded after the color_map_id element as in the following SEI message. In a variant, the syntax element colour_map_model_id is the first element in colour_transform( ).

| | Descriptor |
|---|---|
| colour_mapping_info( payloadSize ) { | |
|   colour_map_id | ue(v) |
|   colour_map_model_id | ue(v) |
|   colour_map_cancel_flag | u(1) |
|   if( !colour_map_cancel_flag ) { | |
|     colour_map_repetition_period | ue(v) |
|     colour_map_video_signal_type_present_flag | u(1) |
|     if(colour_map_video_signal_type_present_flag ) { | |
|       colour_map_video_format | u(3) |
|       colour_map_video_full_range_flag | u(1) |
|       colour_map_description_present_flag | u(1) |
|       if (colour_map_description_present_flag) { | |
|         colour_map_primaries | u(8) |
|         colour_map_transfer_characteristics | u(8) |
|         colour_map_matrix_coeffs | u(8) |
|       } | |
|     } | |
| if(colour _map_model_id = = 0 ) { | |
| 3D_ LUT_ colour_data ( ) | |
| } else if(colour _map_model_id = = 1 ) { | |
| Matrix_Gain_Offset ( ) | |
| } else if(colour _map_model_id = = 2 ) { | |
| Three_1D_LUT_ colour_data ( ) | |
| } else if(colour _map_model_id = = 3 ) { | |
| Three_1D_LUT_ colour_data ( ) | |
| Matrix_Gain_Offset ( ) } | |
|   } | |
| } | |

Advantageously, the syntax element colour_map_model_id and possibly colour_map_id are used to check whether a renderer is capable of using the color metadata, i.e. if the renderer is capable of applying the color transform transmitted in the SEI message. If the renderer is not capable of using the color metadata transmitted in a SEI message, this SEI message is discarded. When several SEI messages are transmitted, each of them describing different color transforms, some of the SEI messages can be discarded while others can be used by the renderer.

The first parameters that describe the colour mapped output decoded pictures video signal characteristics are for example the following ones: colour_map_video_signal_type_present_flag, colour_map_video_format, colour_map_video_full_range_flag, colour_map_description_present_flag, colour_map_primaries, colour_map_transfer_characteristics, colour_map_matrix_ coeffs. The colour_map_primaries indicates for example the CIE 1931 coordinates of the primaries of colour mapped output decoded pictures video signal. The second parameters (colour transform) describe the colour transform and can be a 3×3 gain matrix plus three offsets or a 3D LUT or any other parameters describing a colour transform.

A renderer is characterized by the set of video formats that it is capable of displaying. The first parameters of this SEI message are used by the renderer to perform the appropriate signal conversion corresponding to its supported output video formats. If the colour_map_primaries indicates a Rec. 709 colour mapped output decoded pictures video signal, the renderer selects the appropriate rendering video format corresponding to Rec.709.

Advantageously, several SEI messages are encoded with the video signal Ienc by an encoder Enc in the video bitstream as depicted on FIG. 9. As an example, the original video signal I and thus the output decoded pictures video signal are compliant with Rec.709, then a first SEI message SEI1 is encoded with the appropriate transform T1 to transform this Rec. 709 output decoded pictures video signal into a Rec. 2020 (i.e. ITU-R BT 2020) mapped output decoded pictures video signal and a second SEI message SEI2 is encoded with the appropriate transform T2 to transform this Rec.709 output decoded pictures video signal into a Rec. 601 colour mapped output decoded pictures video signal. The encoded signal (Ienc+SEI1+SEI2) is sent to a decoder Dec. The decoder Dec decodes the video signal into an output decoded pictures video signal Idec and into a first SEI message SEI1 and a second SEI message SEI2. With this information a Rec. 709 compliant renderer Disp1 is going to display the Rec. 709 output decoded pictures video signal Idec and thus disgards the SEI messages. A Rec.2020 compliant renderer Disp2 is going to display the Rec. 2020 colour mapped output decoded pictures video signal and thus uses the first SEI message SEI1. This renderer Disp2 applies the transform T1 decoded from the first SEI message SEI1 to map the colours of the Rec. 709 output decoded pictures video signal Idec and displays the colour mapped output decoded pictures video signal T1(Idec). If the renderer is a near Rec.2020 compliant display, it may further adapt the Rec. 2020 colour mapped output decoded pictures video signal to its own characteristics.

A Rec. 601 compliant renderer Disp3 is going to display the Rec. 601 colour mapped output decoded pictures video signal and thus uses the second SEI message SEI2. This renderer Disp3 applies the transform decoded from the second SEI message SEI2 to map the colours of the Rec. 709 output decoded pictures video signal Idec and displays the colour mapped output decoded pictures video signal T2(Idec).

On FIG. 9 a single decoder Dec is represented. According to a variant, several decoders are used, e.g. one for each renderer.

This SEI message provides information to enable remapping of the colour samples of the output decoded pictures for customization to particular display environments. The remapping process maps coded sample values in the RGB colour space to target sample values. The mappings are expressed either in the luma or RGB colour space domain, and should be applied to the luma component or to each RGB component produced by colour space conversion of the decoded picture accordingly.

The decoded color transform is applied to decoded pictures belonging to a layer identified for example by the index nuh_layer_id of the NAL Unit Header (as defined in section 7.3.1.2 of the document JCTVC-L1003 of Joint Collaborative Team on Video Coding (JCT-VC) of ITU-T SG16 WP3).

colour_map_id contains an identifying number that may be used to identify the purpose of the colour mapping model. Values of colour_map_id may be used as determined by the application. The colour_map_id can be used to support colour mapping operations that are suitable for different display scenarios. For example, different values of colour_map_id may correspond to different display bit depths.

colour_map_cancel_flag equal to 1 indicates that the colour mapping information SEI message cancels the persistence of any previous colour mapping information SEI message in output order. colour_map_cancel_flag equal to 0 indicates that colour mapping information follows.

colour_map_repetition_period specifies the persistence of the colour mapping information SEI message and may specify a picture order count interval within which another colour mapping information SEI message with the same value of colour_map_id or the end of the coded video sequence shall be present in the bitstream. colour_map_repetition_period equal to 0 specifies that the colour map information applies to the current decoded picture only.

colour_map_repetition_period equal to 1 specifies that the colour map information persists in output order until any of the following conditions are true:
  A new coded video sequence begins.
  A picture in an access unit containing a colour mapping information SEI message with the same value of colour_map_id is output having a picture order count (known as POC) greater than the POC of the current decoded picture, denoted PicOrderCnt(CurrPic).

colour_map_repetition_period equal to 0 or equal to 1 indicates that another colour mapping information SEI message with the same value of colour_map_id may or may not be present.

colour_map_repetition_period greater than 1 specifies that the colour map information persists until any of the following conditions are true:
  A new coded video sequence begins.
  A picture in an access unit containing a colour mapping information SEI message with the same value of colour_map_id is output having a POC greater than PicOrderCnt(CurrPic) and less than or equal to PicOrderCnt(CurrPic)+colour_map_repetition_period.

colour_map_repetition_period greater than 1 indicates that another colour mapping information SEI message with the same value of colour_map_id shall be present for a picture in an access unit that is output having a POC greater than PicOrderCnt(CurrPic) and less than or equal to PicOrderCnt(CurrPic)+colour_map_repetition_period; unless the bitstream ends or a new coded video sequence begins without output of such a picture.

colour_map_video_signal_type_present_flag, colour_map_video_format, colour_map_video_full_range_flag, colour_map_description_present_flag, colour_map_primaries, colour_map_transfer_characteristics, colour_map_matrix_coeffs semantic is the same as the semantic of the syntax elements video_signal_type_present_flag, video_format, video_full_range_flag, colour_description_present_flag, colour_primaries, transfer_characteristics, matrix_coeffs in VUI (specified in Annex E of ITU-T H.265) respectively. However, these syntax elements are advantageosuly used in the present invention to describe the colour mapped output decoded pictures video signal characteristics while in the VUI it is used to describe the input video signal characteristics.

According to a variant, several colour transforms (i.e. at least two) are encoded in one and the same SEI message. In this case, the first parameters describe the colour output decoded pictures video signal characteristics remapped by the successive colour transforms. As an example, in the Table 2A, three colour transforms are encoded. These color transforms are to be applied successively. The first parameters describe the video signal characteristics of the colour output decoded pictures remapped by color_transform1 ( ) followed by color_transform2 ( ) followed by color_transform3 ( ).

TABLE 2A

| | Descriptor |
|---|---|
| colour_mapping_info( payloadSize ) { | |
|   colour_map_id | ue(v) |
|   colour_map_cancel_flag | u(1) |
|   if( !colour_map_cancel_flag ) { | |
|     colour_map_repetition_period | ue(v) |
|     colour_map_video_signal_type_present_flag | u(1) |
|     if(colour_map_video_signal_type_present_flag ) { | |
|       colour_map_video_format | u(3) |
|       colour_map_video_full_range_flag | u(1) |
|       colour_map_description_present_flag | u(1) |
|       if (colour_map_description_present_flag) { | |
|         colour_map_primaries | u(8) |
|         colour_map_transfer_characteristics | u(8) |
|         colour_map_matrix_coeffs | u(8) |
|       } | |
|     } | |
|     colour_transform1 ( ) | |
|     colour_transform2 ( ) | |
|     colour_transform3 ( ) | |
|   } | |
| } | |

As an example, 4 color transforms are encoded that are to be applied sucessively. The three first color transforms are 3 1D LUT and the fourth color transform is a function Matrix_Gain_Offset ( ). Exemplarily, the colour output decoded pictures comprises three components Y'CbCr or R'G'B' and each 1D color LUT relates to one color component. Instead of applying a 3D LUT on the components of the colour output decoded pictures, one 1D LUT is applied independently on each color component. This solution reduces memory requirements because it makes interpolation easier. However, it breaks component mapping correlation. Applying a function Matrix_Gain_Offset ( ), for example a 3×3 matrix with three offsets, after the three 1D color LUTs makes it possible to compensate the decorrelation between components by reintroducing component correlation and offsets.

According to a variant, a first set of first parameters describe the video signal characteristics of the colour output decoded pictures remapped by the color_transform1 ( ), a second set of first parameters describe the video signal characteristics of the colour output decoded pictures remapped by the color_transform2 ( ) and a third set of first parameters describe the video signal characteristics of the colour output decoded pictures remapped by the color_transform3 ( ). Thus, a renderer can either applies successively the three transforms or only the first two transforms or only the first transform.

According to yet another variant, a first set of first parameters describe the video signal characteristics of the colour output decoded pictures remapped by several color transforms. Specifically, the first parameters describe the video signal characteristics of the colour output decoded pictures remapped by color_transform1 ( ) or by color_transform2 ( ) or by color_transform3 ( ), i.e. the different color transforms thus remap the colour output decoded pictures towards the same color space. The renderer is going to apply only one of the several color transforms. The choice of the color transform to be applied is made by the renderer, for example, according to its computation architecture capabilities and/or its embedded circuitry. As an example, in the table 2B below, two color transforms are encoded. One is represented by a 3D LUT and the other one by a matrix and offsets as defined in Table 9. Instead of applying successively the two transforms, the renderer applies only one of them. In this case, the first parameters describe the video signal characteristics of the colour output decoded pictures remapped by either 3D_LUT_colour_data ( ) or by Matrix_Gain_Offset ( ).

TABLE 2B

| | Descriptor |
|---|---|
| colour_mapping_info( payloadSize ) { | |
|   colour_map_id | ue(v) |
|   colour_map_cancel_flag | u(1) |
|   if( !colour_map_cancel_flag ) { | |
|     colour_map_repetition_period | ue(v) |
|     colour_map_video_signal_type_present_flag | u(1) |
|     if(colour_map_video_signal_type_present_flag ) { | |
|       colour_map_video_format | u(3) |
|       colour_map_video_full_range_flag | u(1) |
|       colour_map_description_present_flag | u(1) |
|       if (colour_map_description_present_flag) { | |
|         colour_map_primaries | u(8) |
|         colour_map_transfer_characteristics | u(8) |
|         colour_map_matrix_coeffs | u(8) |
|       } | |
|     } | |
|     3D_LUT_colour_data ( ) | |
|     Matrix_Gain_Offset ( ) | |
|   } | |
| } | | colour_transform( ) in Table 1, color_transform1 ( ), color_transform2 ( ), or colour_transform3( ) in Table 2A are for example defined by the function 3D_LUT_colour_data ( ) of Table 3 or 4 or by the function Matrix_Gain_Offset ( ) of Table 9.

The color transforms in the Table 2B are for example derived from the color transforms of Tables 3, 4 and 9. However, an additional syntax element colour_map_model_id is encoded that indicates the type of transform (3D LUT, 1D LUT with a matrix, matrix . . . etc). The syntax element colour_map_model_id is for example the first element in the generic colour_transform( ).

TABLE 3 coding of the 3D LUT colour data

| | Descriptor |
|---|---|
| 3D_LUT_colour_data ( ) { | |
|   nbpCode | u(3) |
|   coding_octant(0, 0,0,0) | |
| } | | nbpCode indicates the 3D LUT size as listed in Table 5 for the given value of nbpCode.

According to a variant, 3D_LUT_colour_data ( ) is defined as follows in table 4.

TABLE 4 coding of the 3D LUT colour data

| | Descriptor |
|---|---|
| 3D_LUT_colour_data ( ) { | |
|   nbpCode | u(3) |
|   NbitsPerSample | u(5) |

TABLE 4-continued coding of the 3D LUT colour data

| | Descriptor |
|---|---|
|   coding_octant(0, 0,0,0) | |
| } | | nbpCode indicates the 3D LUT size as listed in Table 5 for the given value of nbpCode. The quantizer value can be encoded by the 3D_LUT_colour_data( ) function.

NbitsPerSample indicates a number of bits used to represent the colour values, i.e. the bit depth of the 3D LUT samples.

TABLE 5

Interpretation of nbpCode

| nbpCode | 3D LUT size |
|---|---|
| 0 | 2 |
| 1 | 3 |
| 2 | 5 |
| 3 | 9 |
| 4 | 17 |
| 5 | 33 |

Figure 4:
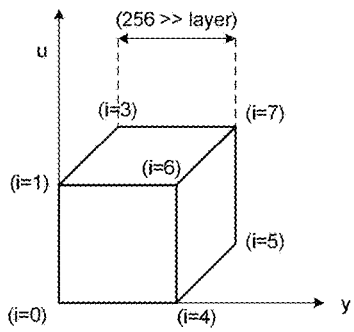
FIG. 4 depicts the position of 8 vertices of an octant.

The ouput of the 3D LUT decoding is a 3 dimension array LUT of size nbp×nbp×nbp. Each LUT array element is called a vertex and is associated with 3 reconstructed sample values (recSamplesY, recSamplesU, recSamplesV) of bit depth equal to (NbitsPerSample). A vertex lut[i][j][k] is said to belonging to layer layer_id if the values of i % (nbp>>layer_id), j % (nbp>>layer_id), k % (nbp>>layer_id) are equal to zero. One vertex may belong to several layers. An octant of layer layer_id is composed of 8 neighboring vertices belonging to layer_id (FIG. 4).

The decoding of the octant(layer_id, y,u,v) is a recursive function as shown in Table 6.

TABLE 6 syntax elements for coding_octant( )

| | Descriptor |
|---|---|
| coding_octant ( layer_id, y,u,v) { | |
|   for( i = 0; i < 8 ; i++ ) { | |
|     encoded_flag[i] | u(1) |
|     if ( encoded_flag[i] ) { | |
|       resY[j] | ue(v) |
|       resU[j] | ue(v) |
|       resV[j] | ue(v) |
|     } | |
|   } | |
|   split_flag | u(1) |
|   if( split_flag ) { | |
|     for( i = 0; i < 8 ; i++ ) { | |
|       coding_octant ( layer_id+1, y+dy[i],u+du[i],v+dv[i]) | |
|     } | |
|   } | |
| } | | split_flag specifies whether an octant is split into octants with half horizontal and vertical size. The values (y,u,v) specify the location of the first vertex in the 3D LUT.

Figure 5:
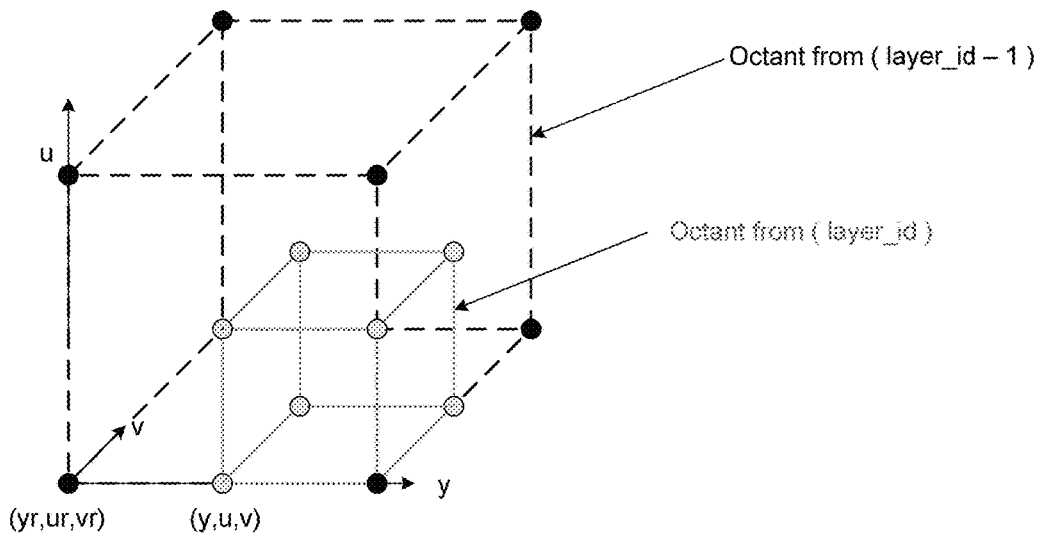
FIG. 5 depicts one octant (layer_id) in grey and its parent octant in black (layer_id−1)

Each octant is composed of 8 vertices (i=0, . . . 7) associated with a flag (encoded_flag[i]) indicating whether the residual components values (resY[i],resU[i], resV[i]) are encoded or all inferred to be zero. The component values are reconstructed by adding the residuals to the prediction of the components values. The prediction of the components values is computed using for example tri-linear interpolation of the 8 neighboring vertices of layer_id−1 (FIG. 5). Once reconstructed a vertex is marked as reconstructed.

TABLE 7 values dy[i], du[i] and dv[i] in function of index i, for vertices belonging to layer = layer_id.

If (y + dy[i]), (u + du[i]) and (v + dv[i]) are the 8 children octants coordinates (coordinates of the first 3D colour vertex) of the current octant (having (y, u, v) as first vertex (i = 0) coordinates), the values dy[i], du[i] and dv[i] for a given layer are depicted in Table 7.i

| i | dy[i] | du[i] | dv[i] |
|---|---|---|---|
| 0 | 0 | 0 | 0 |
| 1 | 0 | 0 | nbp >> layer_id |
| 2 | 0 | nbp >> layer_id | 0 |
| 3 | 0 | nbp >> layer_id | nbp >> layer_id |
| 4 | nbp >> layer_id | 0 | 0 |
| 5 | nbp >> layer_id | 0 | nbp >> layer_id |
| 6 | nbp >> layer_id | nbp >> layer_id | 0 |
| 7 | nbp >> layer_id | nbp >> layer_id | nbp >> layer_id |

The reconstructed 3D colour LUT samples (recSamplesY[i], recSamplesU[i], recSamplesV[i]) for the vertex ((y+dy[i]), (u+du[i]), (v+dv[i])) belonging to an octant of the layer=layer_id is given by:

$$recSamplesY[i]=resY[i]+predSamplesY[i]$$

$$recSamplesU[i]=resU[i]+predSamplesU[i]$$

$$recSamplesV[i]=resV[i]+predSamplesV[i]$$

where the values of predSampleY[i], predSamplesU[i] and predSamplesV[i] are derived using tri-linear interpolation with the 8 vertices of the octant of layer=layer_id−1 that contains the current octant.

According to a first variant embodiment, the 3D_LUT_colour_data ( ) in the SEI message described above is advantageously replaced by parameters Three_1D_LUT_colour_data ( ) describing three 1D LUTs.

According to a second variant embodiment, the 3D_LUT_colour_data ( ) in the SEI message described above is advantageously replaced by parameters describing a colour transform such as a 3×3 gain matrix plus three offsets as depicted in Tables 8 and 9. The colour_transform ( ) in Table 1 or color_transform1 ( ), color_transform2 ( ), or colour_transform3( ) in Table 2b are for example defined by the function Matrix_Gain_Offset ( ) of Table 8.

TABLE 8

Matrix/Offset colour mapping SEI message

| | Descriptor |
|---|---|
| colour_mapping_info( payloadSize ) { | |
|   colour_map_id | ue(v) |
|   colour_map_cancel_flag | u(1) |
|   if( !colour_map_cancel_flag ) { | |
|     colour_map_repetition_period | ue(v) |
|     colour_map_video_signal_type_present_flag | u(1) |

TABLE 8-continued

Matrix/Offset colour mapping SEI message

| | Descriptor |
|---|---|
|     if(colour_map_video_signal_type_present_flag ) { | |
|       colour_map_video_format | u(3) |
|       colour_map_video_full_range_flag | u(1) |
|       colour_map_description_present_flag | u(1) |
|       if (colour_map_description_present_flag) { | |
|         colour_map_primaries | u(8) |
|         colour_map_transfer_characteristics | u(8) |
|         colour_map_matrix_coeffs | u(8) |
|       } | |
|     } | |
|     Matrix_Gain_Offset ( ) | |
|   } | |
| } | |

TABLE 9 syntax elements for Matrix_Gain_Offset( )

| | Descriptor |
|---|---|
| Matrix_Gain_Offset ( ) { | |
|   For (i=0;i<9;i++){ | |
|     Gain[i] | u(8) |
|   } | |
|   For (i=0;i<3;i++){ | |
|     Offset[i] | u(8) |
|   } | |
| } | |

Gain[i] represents the values of the matrix coefficients and Offset[i] represents the values of the offsets.

Figure 6A:
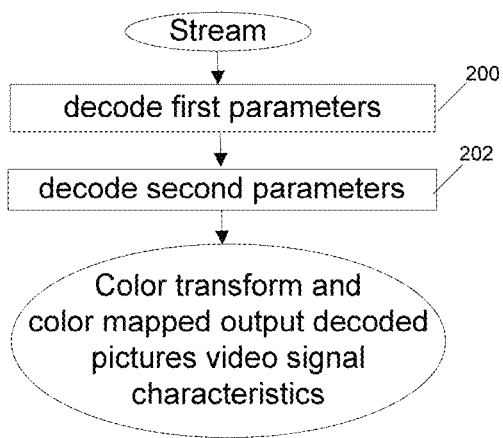
FIGS. 6A and 6B represent flowcharts of a decoding method according to various embodiments of the invention.

FIG. 6A represents a flowchart of a decoding method according to an exemplary and non-limiting embodiment of the invention.

In a step 200, the first parameters that describe the colour mapped output decoded pictures video signal characteristics are decoded from a stream, e.g. from a SEI message as disclosed above.

In a step 202, the second parameters that describe the colour transform are decoded from the stream, e.g. from a SEI message.

Figure 6B:
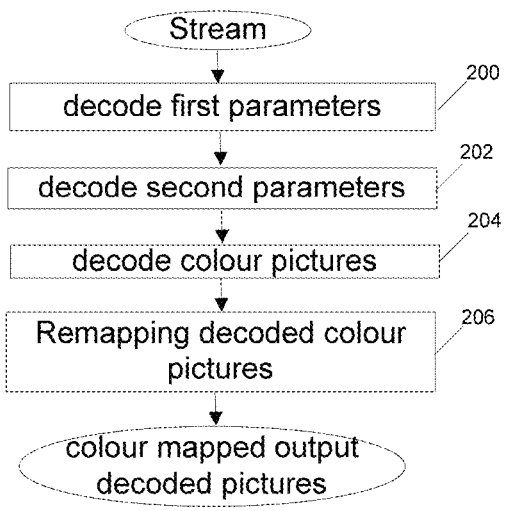

In a variant depicted on FIG. 6B, the method further comprises decoding (step 204) colour pictures from a stream and remapping (step 206) the decoded colour pictures with the colour transform into colour mapped output decoded pictures. The colour mapped output decoded pictures may then be displayed.

According to a specific and non-limiting embodiment, the colour mapped output decoded pictures and the first parameters are transmitted to a display. The first parameters may be used by the display to interpret the colour mapped output decoded pictures.

FIG. 7 represents an exemplary architecture of an encoder 1 configured to encode the first and second parameters in a stream. Encoder 1 comprises following elements that are linked together by a data and address bus 64:

- a microprocessor 61 (or CPU), which is, for example, a DSP (or Digital Signal Processor);
- a ROM (or Read Only Memory) 62;
- a RAM (or Random Access Memory) 63;
- one or several I/O (Input/Output) devices 65 such as for example a keyboard, a mouse, a webcam; and
- a power source 66.

According to a variant, the power source 66 is external to the encoder. Each of these elements of FIG. 7 are well known by those skilled in the art and won't be disclosed further. In each of mentioned memory, the word «register» used in the specification designates in each of the memories mentioned, both a memory zone of low capacity (some binary data) as well as a memory zone of large capacity (enabling a whole program to be stored or all or part of the data representative of data calculated or to be displayed). ROM 62 comprises a program and encoding parameters. Algorithm of the encoding method according to the invention is stored in the ROM 62. When switched on, the CPU 61 uploads the program 620 in the RAM and executes the corresponding instructions.

RAM 63 comprises, in a register, the program executed by the CPU 61 and uploaded after switch on of the encoder 1, input data in a register, encoded data in different state of the encoding method in a register and other variables used for encoding in a register.

FIG. 8 represents an exemplary architecture of a decoder 2 configured to decode the first parameters and second parameters from a stream. Decoder 2 comprises following elements that are linked together by a data and address bus 74:

a microprocessor 71 (or CPU), which is, for example, a DSP (or Digital Signal Processor);
a ROM (or Read Only Memory) 72;
a RAM (or Random Access Memory) 73;
an I/O interface 75 for reception of data to transmit, from an application; and
a battery 76.

According to a variant, the battery 76 is external to the encoder. Each of these elements of FIG. 8 are well known by those skilled in the art and won't be disclosed further. In each of mentioned memory, the word «register» used in the specification can correspond to area of small capacity (some bits) or to very large area (e.g. a whole program or large amount of received or decoded data). ROM 72 comprises at least a program and decoder parameters. Algorithm of the decoding method according to the invention is stored in the ROM 72. When switched on, the CPU 71 uploads the program 720 in the RAM and executes the corresponding instructions.

RAM 73 comprises, in a register, the program executed by the CPU 71 and uploaded after switch on of the decoder 2, input data in a register, decoded data in different state of the decoding method in a register, and other variables used for decoding in a register.

After decoding the first and second parameters, remapping of the decoded colour pictures with the colour transform may be achieved by the decoder in a Set-top-Box or a Blu-Ray player. In this case, the colour mapped output decoded pictures and the first parameters or part of them may be transmitted to a display (e.g. using HDMI, SDI, Display Port, DVI). The display may then use the first parameters to interpret the colour mapped output decoded pictures for their rendering. In a variant, remapping of the decoded colour pictures with the colour transform is achieved in a TV set specifically in a built-in decoder. In this case, the first parameters are used to interpret the colour mapped output decoded pictures for rendering.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding, comprising:
   encoding first parameters representative of video signal characteristics of decoded pictures color mapped by at least one color transform; and
   encoding second parameters representative of said at least one color transform,
   wherein said first parameters representative of video signal characteristics comprise at least one of the following syntax elements:
   a first syntax element, wherein said first syntax element has the same semantics as the Video Usability Information video full range flag syntax element except that said first syntax element describes the decoded pictures color mapped by said at least one color transform;
   a second syntax element, wherein said second syntax element has the same semantics as the Video Usability Information color primaries syntax element except that said second syntax element describes the decoded pictures color mapped by said at least one color transform;
   a third syntax element, wherein said third syntax element has the same semantics as the Video Usability Information transfer characteristics syntax element except that said third syntax element describes the decoded pictures color mapped by said at least one color transform; and
   a fourth syntax element, wherein said fourth syntax element has the same semantics as the Video Usability Information matrix coefficients syntax element except that fourth syntax element describes the decoded pictures color mapped by said at least one color transform and
   wherein said second parameters comprise at least one of a Look-Up Table and a three-by-three matrix.

2. The method according to claim 1, wherein said method further comprises encoding a fifth syntax element for identifying the purpose of the color mapping model.

3. The method according to claim 1, wherein said first and second parameters are encoded in a supplement enhancement information message.

4. The method according to claim 3, wherein said method further comprises encoding a sixth syntax element indicating that the color mapping information Supplement Enhancement Information message cancels the persistence of any previous color mapping information Supplement Enhancement Information message in output order in the case where said sixth syntax element equals to 1 and indicating that color mapping information follows in the case where said sixth syntax element equals to 0.

5. The method according to claim 3, wherein said method further comprises encoding a seventh syntax element specifying the persistence of the color mapping information Supplement Enhancement Information message.

6. The method according to claim 1, wherein at least first and second sets of second parameters are encoded, said first set being representative of a first color transform and said second set being representative of a second color transform and wherein said first parameters are representative of video signal characteristics of said pictures color mapped by said first color transform and further by said second color transform.

7. A method for decoding, comprising:
   decoding a sequence of pictures;
   decoding first parameters representative of video signal characteristics of said decoded pictures color mapped by at least one color transform; and
   decoding second parameters representative of said at least one color transform,
   wherein said first parameters representative of video signal characteristics comprise at least one of the following syntax elements:
   a first syntax element, wherein said first syntax element has the same semantics as the Video Usability Information video full range flag syntax element except that said first syntax element describes the decoded pictures color mapped by said at least one color transform;
   a second syntax element, wherein said second syntax element has the same semantics as the Video Usability Information color primaries syntax element except that said second syntax element describes the decoded pictures color mapped by said at least one color transform;
   a third syntax element, wherein said third syntax element has the same semantics as the Video Usability Information transfer characteristics syntax element except that said third syntax element describes the decoded pictures color mapped by said at least one color transform; and
   a fourth syntax element, wherein said fourth syntax element has the same semantics as the Video Usability Information matrix coefficients syntax element except that fourth syntax element describes the decoded pictures color mapped by said at least one color transform and
   wherein said second parameters comprise at least one of a Look-Up Table and a three-by-three matrix.

8. The method according to claim 7, wherein said method further comprises decoding a fifth syntax element for identifying the purpose of the color mapping model.

9. The method according to claim 7, wherein said first and second parameters are decoded from a supplement enhancement information message.

10. The method according to claim 9, wherein said method further comprises decoding a sixth syntax element indicating that the color mapping information Supplement Enhancement Information message cancels the persistence of any previous color mapping information Supplement Enhancement Information message in output order in the case where said sixth syntax element equals to 1 and indicating that color mapping information follows in the case where said sixth syntax element equals to 0.

11. The method according to claim 9, wherein said method further comprises decoding a seventh syntax element specifying the persistence of the color mapping information Supplement Enhancement Information message.

12. The method according to claim 7, wherein at least first and second sets of second parameters are decoded, said first set being representative of a first color transform and said second set being representative of a second color transform and wherein said first parameters are representative of video signal characteristics of said pictures color mapped by said first color transform and further by said second color transform.

13. The method according to claim 7, further comprising:
color mapping said decoded pictures with said at least one color transform into mapped decoded pictures.

14. An encoder comprising at least a processor configured to:
  encode first parameters representative of video signal characteristics of decoded pictures color mapped by at least one color transform; and
  encode second parameters representative of said at least one color transform,
  wherein said first parameters representative of video signal characteristics comprise at least one of the following syntax elements:
  a first syntax element, wherein said first syntax element has the same semantics as the Video Usability Information video full range flag syntax element except that said first syntax element describes the decoded pictures color mapped by said at least one color transform;
  a second syntax element, wherein said second syntax element has the same semantics as the Video Usability Information color primaries syntax element except that said second syntax element describes the decoded pictures color mapped by said at least one color transform;
  a third syntax element, wherein said third syntax element has the same semantics as the Video Usability Information transfer characteristics syntax element except that said third syntax element describes the decoded pictures color mapped by said at least one color transform; and
  a fourth syntax element, wherein said fourth syntax element has the same semantics as the Video Usability Information matrix coefficients syntax element except that fourth syntax element describes the decoded pictures color mapped by said at least one color transform and
  wherein said second parameters comprise at least one of a Look-Up Table and a three-by-three matrix.

15. The encoder according to claim 14, wherein said at least one processor is further configured to encode a fifth syntax element for identifying the purpose of the color mapping model.

16. The encoder according to claim 14, wherein said at least one processor is configured to encode said first and second parameters in a supplement enhancement information message.

17. The encoder according to claim 16, wherein said at least one processor is further configured to encode a sixth syntax element indicating that the color mapping information Supplement Enhancement Information message cancels the persistence of any previous color mapping information Supplement Enhancement Information message in output order in the case where said sixth syntax element equals to 1 and indicating that color mapping information follows in the case where said sixth syntax element equals to 0.

18. The encoder according to claim 16, wherein said at least one processor is further configured to encode a seventh syntax element specifying the persistence of the color mapping information Supplement Enhancement Information message.

19. The encoder according to claim 14, wherein said at least one processor is further configured to encode at least first and second sets of second parameters, said first set being representative of a first color transform and said second set being representative of a second color transform and wherein said first parameters are representative of video signal characteristics of said pictures color mapped by said first color transform and further by said second color transform.

20. A decoder comprising at least a processor configured to:
  decode a sequence of pictures;
  decode first parameters representative of video signal characteristics of said decoded pictures color mapped by at least one color transform; and
  decode second parameters representative of said at least one color transform,
  wherein said first parameters representative of video signal characteristics comprise at least one of the following syntax elements:
  a first syntax element, wherein said first syntax element has the same semantics as the Video Usability Information video full range flag syntax element except that said first syntax element describes the decoded pictures color mapped by said at least one color transform;
  a second syntax element, wherein said second syntax element has the same semantics as the Video Usability Information color primaries syntax element except that said second syntax element describes the decoded pictures color mapped by said at least one color transform;
  a third syntax element, wherein said third syntax element has the same semantics as the Video Usability Information transfer characteristics syntax element except that said third syntax element describes the decoded pictures color mapped by said at least one color transform; and
  a fourth syntax element, wherein said fourth syntax element has the same semantics as the Video Usability Information matrix coefficients syntax element except that fourth syntax element describes the decoded pictures color mapped by said at least one color transform and
  wherein said second parameters comprise at least one of a Look-Up Table and a three-by-three matrix.

21. The decoder according to claim 20, wherein said at least one processor is further configured to decode a fifth syntax element for identifying the purpose of the color mapping model.

22. The decoder according to claim 20, wherein said at least one processor is further configured to decode said first and second parameters from a supplement enhancement information message.

23. The decoder according to claim 22, wherein said at least one processor is further configured to decode a sixth syntax element indicating that the color mapping information Supplement Enhancement Information message cancels the persistence of any previous color mapping information Supplement Enhancement Information message in output order in the case where said sixth syntax element equals to 1 and indicating that color mapping information follows in the case where said sixth syntax element equals to 0.

24. The decoder according to claim 22, wherein said at least one processor is further configured to decode a seventh syntax element specifying the persistence of the color mapping information Supplement Enhancement Information message.

25. The decoder according to claim 20, wherein said at least one processor is further configured to decode at least first and second sets of second parameters, said first set being representative of a first color transform and said second set being representative of a second color transform and wherein said first parameters are representative of video signal characteristics of said pictures color mapped by said first color transform and further by said second color transform.

26. The decoder according to claim 20, wherein said at least one processor is further configured to:
  color map said decoded pictures with said at least one color transform into mapped decoded pictures.

* * * * *